US008825206B2

(12) United States Patent
Ferreira et al.

(10) Patent No.: US 8,825,206 B2

(45) Date of Patent: Sep. 2, 2014

(54) DISPLAY WINDOW DEVICE FOR SALE OF PRODUCTS

(75) Inventors: Xavier Ferreira, Corte (FR); Jean-Mathieu Rocchi, Corte (FR)

(73) Assignee: Xavier Ferreira, Corte (FR)

(*) Notice: Subject to any disclaimer, the term of this patent is extended or adjusted under 35 U.S.C. 154(b) by 353 days.

(21) Appl. No.: 12/516,881

(22) PCT Filed: Nov. 28, 2007

(86) PCT No.: PCT/FR2007/052413

§ 371 (c)(1), (2), (4) Date: Oct. 13, 2009

(87) PCT Pub. No.: WO2008/065307

PCT Pub. Date: Jun. 5, 2008

(65) Prior Publication Data

US 2010/0096400 A1 Apr. 22, 2010

(30) Foreign Application Priority Data

Nov. 29, 2006 (FR) .................................... 06 55190

(51) Int. Cl.

*G06F 17/00* (2006.01)
*G07F 11/38* (2006.01)
*G07F 9/02* (2006.01)
*G07F 11/16* (2006.01)

(52) U.S. Cl.

CPC *G07F 9/02* (2013.01); *G07F 11/38* (2013.01); *G07F 11/16* (2013.01)

USPC .......................................... 700/232; 700/216

(58) Field of Classification Search

USPC .................................................. 700/230-243

See application file for complete search history.

(56) References Cited

U.S. PATENT DOCUMENTS

| | | | | |
|---|---|---|---|---|
| 5,322,187 | A | 6/1994 | Zizola | |
| 5,394,911 | A | 3/1995 | Zizola | |
| 5,685,435 | A | 11/1997 | Picioccio et al. | |
| 5,791,512 | A * | 8/1998 | Kanatsuka | 221/2 |
| 5,997,236 | A | 12/1999 | Picioccio et al. | |
| 7,881,822 | B2 * | 2/2011 | Thornton et al. | 700/244 |
| 2004/0169048 | A1 * | 9/2004 | Simmons | 221/92 |
| 2005/0146288 | A1 | 7/2005 | Johnson et al. | |

(Continued)

FOREIGN PATENT DOCUMENTS

| | | |
|---|---|---|
| EP | 0 504 489 | 9/1992 |
| GB | 452 833 | 8/1936 |
| GB | 851 100 | 10/1960 |
| GB | 1 488 753 | 10/1977 |
| JP | 3-20891 A | 1/1991 |
| JP | 4-98392 A | 3/1992 |

(Continued)

OTHER PUBLICATIONS

Office Action issued Oct. 30, 2012 in Japanese Patent Application No. 2009-538756 submitting English translation only.

*Primary Examiner* — Jeffrey Shapiro

(74) *Attorney, Agent, or Firm* — Oblon, Spivak, McClelland, Maier & Neustadt, L.L.P.

(57) ABSTRACT

A display window device for the sale of products is disclosed. The display window device includes a transparent window, a shelf designed to receive different types of products displayed on one side of the window, at least one sensor capable of detecting a force exerted on the window, a meter to count the number of forces, a selector configured to associate a number of forces and a type of product, and an element to deliver a product of the chosen type.

12 Claims, 1 Drawing Sheet

(56) References Cited

U.S. PATENT DOCUMENTS

| | | | | |
|---|---|---|---|---|
| 2005/0251287 | A1 * | 11/2005 | Thornton et al. | 700/233 |
| 2006/0244732 | A1 | 11/2006 | Geaghan | |
| 2007/0069908 | A1 * | 3/2007 | St-Germain | 340/686.1 |
| 2008/0192027 | A1 * | 8/2008 | Morrison | 345/177 |

FOREIGN PATENT DOCUMENTS

| | | | |
|---|---|---|---|
| JP | 2000-276637 | A | 10/2000 |
| WO | 91 15833 | | 10/1991 |
| WO | WO 2004/114102 | A1 | 12/2004 |

* cited by examiner

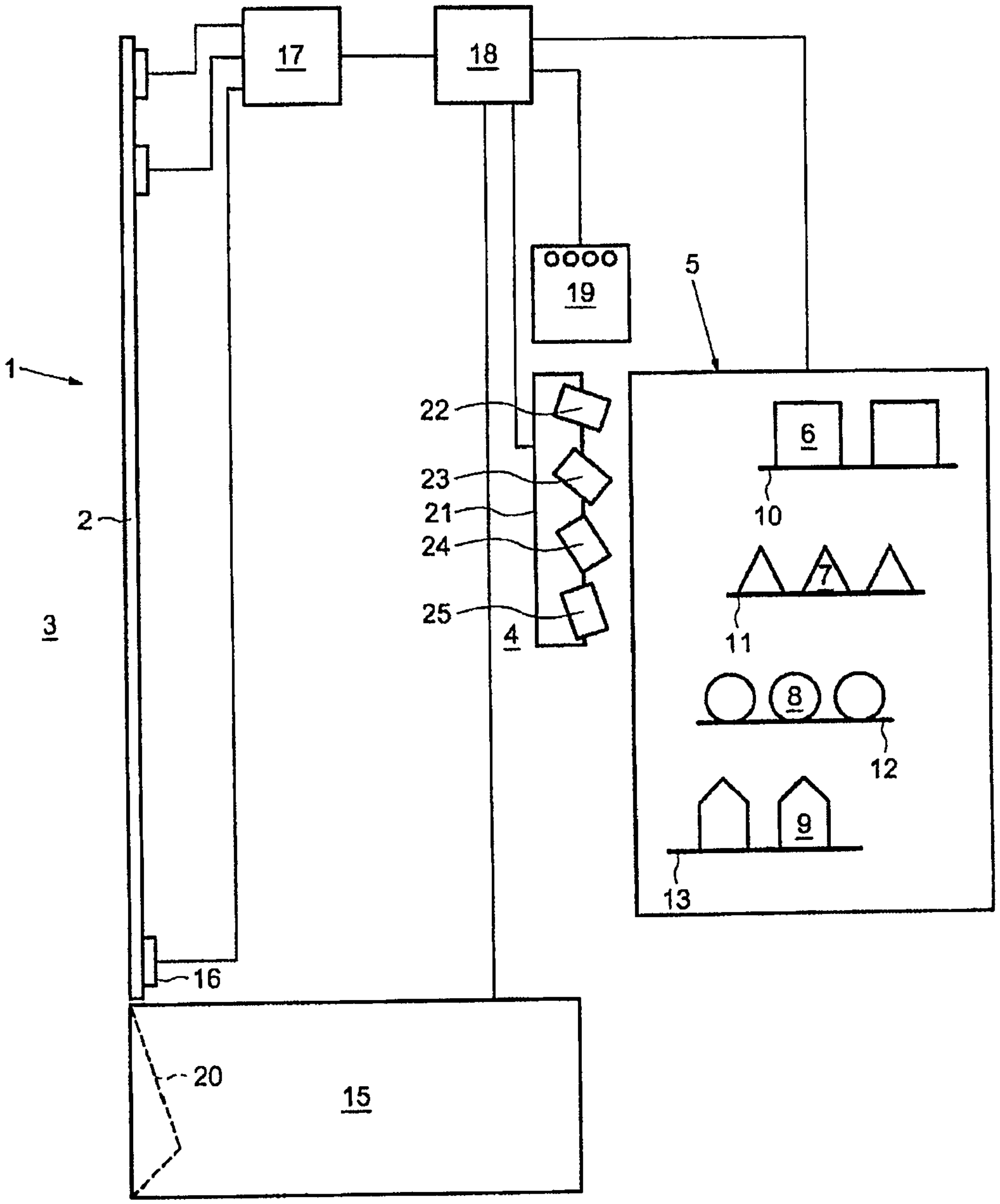
17
18
19
5
1
22
23
21
24
25
4
2
3
6
10
7
11
8
12
9
13
16
20
15

DISPLAY WINDOW DEVICE FOR SALE OF PRODUCTS

BACKGROUND OF THE INVENTION

1. Field of the Invention

The present invention relates to the field of product display windows, more particularly of products intended for sale.

2. Description of the Related Art

Usually, a store front comprises a transparent display window allowing passers-by to see all or some of the products on sale. However, outside opening hours, products cannot be purchased. Store opening times are of the order of 6 to 12 hours per day depending on the national customs and the type of product traded. There remains a dead time of 12 to 18 hours per day which considerably increases the fixed hourly cost of the store. Stores that are open 24 hours a day suffer from difficulties of recruitment and of staff loyalty, very high staff costs, particularly at night and on Sundays and holidays, and frequent administrative interdictions.

Furthermore, certain places such as stations or airports are sometimes fitted with drinks or candy vending machines. These vending machines suffer from a not very attractive presentation of the products and a daunting operating mode for people who are not very used to this type of apparatus, for example old people, the absolute and relative number of which is growing sharply in most countries.

BRIEF SUMMARY OF THE INVENTION

The object of the present invention is to remedy, respond to the unsatisfied need of stores with long opening times, for agreeable presentation and reasonable operating costs. The object of the present invention is to provide an automated display window with a simple structure providing a presentation at least as agreeable as that of a conventional store. The object of the present invention is to provide an automated display window that is simple and user-friendly to use particularly for old or handicapped people.

The display window device for the sale of products comprises a transparent window, at least one shelf designed to accommodate at least one category of products placed on one side of the window, at least one sensor capable of detecting a pressure applied on the window, and a processing unit connected to the output of the pressure sensor in order to deduce therefrom an order for a product of a determined type, with a selector capable of commanding a selective illumination in order to light up the selected product as a function of the detection made and an element for delivering the selected product.

A product of the preselected category may thus be designated to the user and viewed directly thanks to the selective illumination. The user immediately realizes if an error has been committed or if the category of product that is preselected and illuminated selectively in effect corresponds to what he desires. Selective illumination means an illumination that is distinguished from the background illumination, particularly by a higher intensity and/or a different color. Selective illumination may include a plurality of lamps, each lamp being controlled by the selector. The selector controls the lighting of a lamp also for designating a product of a category. A lamp may comprise one or more bulbs depending on the size of the product and the desired light intensity. A lamp generates a light beam directed toward a product of a category.

In the event of error, the user may correct his selection and/or go back by canceling the selection. If the product illuminated selectively corresponds to the desire of the user, confirmation is made by pressing on a key or on the window, for example two short presses close together.

In one embodiment, the device also comprises a counter for counting the number of presses and a selector configured in order to associate a number of presses and a category of products or a determined product.

A product may be delivered to a customer according to the number of presses applied by a customer on the window. Such an operation is particularly intuitive.

In one embodiment, the pressure sensor is attached to the window.

In one embodiment, the pressure sensor is capable of detecting a force applied to the window. It is possible to adjust a range of 1 to 10 Newtons within which the force is taken into account. Below the range, the risk of error is too high for the force to be accepted. Above the range, the user must understand that an excessive pressure gives no result so that the risk of breakage of the window is discouraged.

In one embodiment, the pressure sensor is capable of detecting a pulse applied to the window. It is possible to take account of pulses ranging between 0.01 and 0.1 $ms^{-2}$.

In one embodiment, the pressure sensor is capable of detecting a vibration of the window. It is possible to take account of vibrations ranging between 10 and 100 Hz. It is possible to provide a combined range of frequency and acceleration or else of amplitude.

The sensor may be of the type used in alarm systems, with an appropriate sensitivity.

In one embodiment, the counter and the selector are made in the form of an analog circuit, for example comprising at least one comparator.

In one embodiment, the counter and the selector are made in the form of a digital circuit, for example provided with a programmable controller.

In one embodiment, the counter is configured in order to count from 1 to n, the maximum number of product types being equal to n. The products may be bought one by one.

In one embodiment, the counter is configured in order to count from 1 to $2^n$, the maximum number of product types being equal to n. In this case, it is possible to order products of different types in a single purchase.

In one embodiment, the device comprises a plurality of lamp indicators, each corresponding to a type of product. The viewing of the order is easy. Each lamp indicator may be placed close to a representation of the corresponding product, for example a drawing or a photograph.

In one embodiment, the device comprises at least three pressure sensors and one processing unit connected to the output of said sensors in order to estimate the location of the pressure and deduce therefrom an order intended for the element for delivering a product of the selected type. The window may support representations of the products and representations of the number of products in order to make the order yet more intuitive and natural. In this case, it is sufficient to press on the location of the window where the desired number of the desired product type is represented.

In one embodiment, said order comprises a number and a type of products. It is therefore possible to order several products of several types.

BRIEF DESCRIPTION OF THE DRAWINGS

The present invention will be better understood and other advantages will appear on reading the detailed description of one embodiment taken as an example which is in no way limiting and is illustrated by the appended drawing which is a schematic view of a device according to one aspect of the invention.

DETAILED DESCRIPTION OF THE INVENTION

As can be seen in the FIGURE, the display window device 1 comprises a transparent pane 2 separating the space into an outside zone 3 and an inside zone 4, a storage element 5 provided with shelves 10 to 13 for products of different types 6 to 9, a delivery element 15 for the purchased products, a sensor 16 in contact with the pane 2, a counter 17 connected to an output of the sensor 16, a selector 18 connected to an output of the counter 17, lighting 21, and optionally a display 19 connected to an output of the selector 18. The storage element 5, the delivery element 15, the sensor 16, the counter 17, the selector 18 and the lighting 21 are placed in the inside zone 4.

The shelves 10 to 13 of the storage element 5 may be fixed or movable in translation in order to cause the corresponding products to fall one by one into the delivery element 15. The shelves 10 to 13 may be associated with an actuator, for example a helical screw the rotation of which is also designed to cause the corresponding products to fall one by one into the delivery element 15. The delivery element 15 comprises a movable flap 20, free or lockable, giving access to the product that has fallen into said delivery element 15.

The sensor 16 may be designed to detect a force, for example in the form of a stress gage or of a spring associated with a movement sensor; a vibration, for example a piezoelectric sensor; or an acceleration, for example in the form of an accelerometer. The sensor 16 may be bonded to the pane 2 or placed against the pane 2.

In the embodiment shown, the device comprises three sensors 16 distributed in distinct locations on the pane 2. The presence of several sensors 16 allows a more reliable detection and, optionally, the estimation of a place of impact or of pressure on the pane 2 by goniometry. The estimation of a place of impact or of pressure on the pane 2 is particularly valuable when the pane 2 bears inscriptions, for example indicating the type of product and/or their number, in alphanumerical or graphical form. It is possible to refer to document WO 96/11378.

The counter 17 and the selector 18 may be made in the form of a programmable controller. The counter 17 may be of the type with a maximum number N equal to the number of product types, for example five, or else equal to $2^N$, that is 16 in the example illustrated. In other words, the counter 17 may comprise a number of bits corresponding to the number of shelves 10 to 13. In this case, an order relates to a category of products, the number of products in an order not being limited. Alternatively, the counter 17 may comprise a number of bits corresponding to the number of possible combinations of product types in order to allow a mixture of product types in one and the same order.

The lighting 21 comprises a plurality of lamps 22 to 25, one per product category 6 to 9, each directing a beam of light toward at least one product 6 to 9 of a product category.

The selector 18 is configured to command the storage element 5, the delivery element 15, the lighting 21 and optionally the display 19. The selector 18 is connected to the sensor 16 in order to receive actuation information from the pane 2. The selector 18 may be connected to a change machine or to a payment terminal, for example by payment card, not shown, provided to receive payment for the transaction and authorize the delivery of the purchased products. The selector 18 is capable of commanding the display of the order via the display 19, the actuation of the storage element 5 so that the ordered products fall into the delivery element 15, and the locking of the flap 20 of the delivery element 15. The display 19 may be of the light-emitting diode type, for example at least equal in number to the number of product types, or else with a display screen making it possible to display the name, a logo or a picture of the products. The user may therefore verify the correctness of the order before confirming it, for example by a dual pressure on the pane 2.

The user present in the outside zone 3 desiring to obtain one product of those displayed in the inside zone 4 of the display window on the shelves 10 to 13 presses with his hand against the pane 2 until he obtains an illumination by the lighting 21 properly indicating the type and number of products desired. The user may then confirm the order by pressing twice close together on the pane 2 or else by paying by means of the change machine. The price may be calculated by the change machine according to information transmitted by the selector 18.

This provides a user-friendly display window allowing the act of purchase over an extensive time period, including by people who are not very familiar with automatic apparatus. This makes it possible for people, who were previously prevented therefrom, to procure products. The display window may form part of a product vending machine comprising a frame, a control panel, a product-delivery orifice and a payment terminal.

The invention claimed is:

1. An automated display window device machine for the sale of products stored within the machine, comprising:

a transparent window;

a storage space element designed to accommodate a plurality of different types of products offered for sale, on a first side of the window;

a background illumination system capable of illuminating said plurality of products accommodated in the storage space;

a system of selective illumination capable of directing a light beam toward at least one specific product of said plurality of products accommodated in the storage space;

at least one pressure sensor configured to detect a first pressure applied on a second side of the window, wherein the first side of the window is opposite the second side of the window;

a processing unit connected to said at least one pressure sensor, wherein the processing unit is configured to identify a location of the first pressure on the window based on at least one output signal from the at least one pressure sensor, identify the at least one specific product in the storage space element based on the location of the first pressure on the window, and transmit an order for selective illumination of the at least one specific product in the storage space element; and a selector in communication with said processing unit and said system of selective illumination, wherein the selector is configured to receive the order for selective illumination of the at least one specific product in the storage space element, and energize the system of selective illumination based on the order for selective illumination to selectively illuminate the at least one specific product in the storage space element.

2. An automated display window device machine for the sale of products stored within the machine, comprising:

a transparent window;

a storage space element designed to accommodate a plurality of different types of products offered for sale, on a first side of the window;

a background illumination system capable of illuminating said plurality of products accommodated in the storage space;

a system of selective illumination capable of directing a light beam toward at least one specific product of said plurality of products accommodated in the storage space;

at least one pressure sensor configured to detect a first pressure applied on a second side of the window, wherein the first side of the window is opposite the second side of the window;

a processing unit connected to said at least one pressure sensor, wherein the processing unit is configured to identify a location of the first pressure on the window based on at least one output signal from the at least one pressure sensor, identify the at least one specific product in the storage space element based on the location of the first pressure on the window, and transmit an order for selective illumination of the at least one specific product in the storage space element; and a selector in communication with said processing unit and said system of selective illumination, wherein the selector is configured to receive the order for selective illumination of the at least one specific product in the storage space element, and energize the system of selective illumination based on the order for selective illumination to selectively illuminate the at least one specific product in the storage space element; and a confirmation system is configured to trigger the vending and delivering of said at least one specific product in answer to a confirmation order resulting from a second pressure applied on the second side of the window.

3. The device as claimed in claim 1 or claim 2, wherein the at least one pressure sensor consists of at least three pressure sensors, and the processing unit is capable of estimating the location of the pressure in order to deduce therefrom the order for said product.

4. The device as claimed in claim 1 or claim 2, wherein the window supports representations of products and of a number of products.

5. The device as claimed in claim 1 or claim 2, wherein the at least one pressure sensor is attached to the window.

6. The device as claimed in claim 1 or claim 2, wherein the at least one pressure sensor is capable of detecting a force, a pulse, or a vibration of the window.

7. The device as claimed in claim 1 or claim 2, further comprising:

a counter for sensing a number of pressure applications on the window, wherein the counter is configured to count from 1 to n, the number of product types being equal to n.

8. The device as claimed in claim 1 or claim 2, further comprising:

a counter for sensing a number of pressure applications on the window, wherein the counter is configured in order to count from 1 to $2^n$, the number of product types being equal to n.

9. The device as claimed in claim 1 or claim 2, further comprising:

a plurality of lamp indicators, each corresponding to a type of product.

10. The device as claimed in claim 1, wherein the processing unit is configured to interpret a dual pressure on the window as verification of the correctness of the order.

11. The device as claimed in claim 1, wherein a sensitivity of the pressure sensor is adjustable within a range of 1 to 10 Newtons.

12. The device as claimed in claim 1, wherein the selector is further configured to identify a type of product based on a number of pressure applications on the first side of the window.

* * * * *